(12) United States Patent
Schooler et al.

(10) Patent No.: US 11,349,753 B2
(45) Date of Patent: May 31, 2022

(54) CONVERGED ROUTING FOR DISTRIBUTED COMPUTING SYSTEMS

(71) Applicant: Intel Corporation, Santa Clara, CA (US)

(72) Inventors: Eve M. Schooler, Portola Valley, CA (US); Maruti Gupta Hyde, Portland, OR (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/236,474

(22) Filed: Dec. 29, 2018

(65) Prior Publication Data

US 2019/0140939 A1 May 9, 2019

Related U.S. Application Data

(63) Continuation-in-part of application No. 16/004,299, filed on Jun. 8, 2018, now Pat. No. 10,559,202.
(Continued)

(51) Int. Cl.
*H04L 45/30* (2022.01)
*H04L 47/24* (2022.01)
(Continued)

(52) U.S. Cl.
CPC ........ *H04L 45/3065* (2013.01); *G06K 9/6292* (2013.01); *H04L 41/0893* (2013.01);
(Continued)

(58) Field of Classification Search
None
See application file for complete search history.

(56) References Cited

U.S. PATENT DOCUMENTS

| 8,533,166 B1 * | 9/2013 | Sulieman | G06F 16/183 |
| | | | 707/693 |
| 9,432,430 B1 * | 8/2016 | Klenz | H04L 43/04 |

(Continued)

OTHER PUBLICATIONS

Dabiri, Sina, et al., "Transport-domain application of widely used data sources in the smart transportation: A survey", arXiv:1803.10902v2, accessed at: https://arxiv.org/vc/arxiv/papers/1803/1803.10902v2.pdf, version date: Jun. 12, 2018, 52 pages.
(Continued)

*Primary Examiner* — Reza Aghevli
(74) *Attorney, Agent, or Firm* — Alliance IP, LLC

(57) ABSTRACT

In one embodiment, an apparatus comprises a network interface and a processor. The processor is to: receive, via the network interface, a plurality of data streams to be routed over a network, wherein the plurality of data streams correspond to sensor data captured by a plurality of sensors; identify, from the plurality of data streams, a set of related data streams that are contextually related; identify a convergence function to be performed on the set of related data streams, wherein the convergence function is for transforming the set of related data streams into a converged data stream that is smaller in size than the set of related data streams; perform the convergence function to transform the set of related data streams into the converged data stream; and route, via the network interface, the converged data stream to one or more corresponding destinations over the network.

15 Claims, 11 Drawing Sheets

Related U.S. Application Data

(60) Provisional application No. 62/611,536, filed on Dec. 28, 2017.

(51) Int. Cl.

| | | |
|---|---|---|
| *H04L 43/18* | (2022.01) | |
| *G06K 9/62* | (2022.01) | |
| *H04L 67/12* | (2022.01) | |
| *H04L 69/04* | (2022.01) | |
| *H04L 41/08* | (2022.01) | |
| *H04L 45/302* | (2022.01) | |
| *H04L 47/2483* | (2022.01) | |
| *H04L 47/2416* | (2022.01) | |
| *H04L 67/52* | (2022.01) | |
| *H04L 67/566* | (2022.01) | |
| *H04L 43/08* | (2022.01) | |
| *H04L 67/5651* | (2022.01) | |
| *H04L 41/0893* | (2022.01) | |

(52) U.S. Cl.
CPC .............. *H04L 43/08* (2013.01); *H04L 43/18* (2013.01); *H04L 47/2416* (2013.01); *H04L 47/2483* (2013.01); *H04L 67/12* (2013.01); *H04L 67/18* (2013.01); *H04L 67/2828* (2013.01); *H04L 67/2833* (2013.01); *H04L 69/04* (2013.01); *G06V 2201/10* (2022.01)

(56) References Cited

U.S. PATENT DOCUMENTS

| | | | | |
|---|---|---|---|---|
| 10,096,038 | B2* | 10/2018 | Ramirez | G06Q 10/0635 |
| 10,235,880 | B2* | 3/2019 | Seo | G08G 1/0129 |
| 10,559,202 | B2* | 2/2020 | Yang | G08G 1/091 |
| 2004/0039254 | A1* | 2/2004 | Stivoric | A61B 5/0537 |
| | | | | 600/300 |
| 2005/0113650 | A1* | 5/2005 | Pacione | A61B 5/742 |
| | | | | 600/300 |
| 2005/0162525 | A1* | 7/2005 | Koshikawa | H04N 5/23203 |
| | | | | 348/211.99 |
| 2006/0031102 | A1* | 2/2006 | Teller | G16H 40/63 |
| | | | | 705/3 |
| 2009/0285492 | A1* | 11/2009 | Ramanujapuram | G06F 16/5846 |
| | | | | 382/209 |
| 2010/0030740 | A1* | 2/2010 | Higgins | G09B 29/10 |
| | | | | 715/762 |
| 2010/0125563 | A1* | 5/2010 | Nair | G06Q 30/0275 |
| | | | | 707/709 |
| 2010/0208698 | A1* | 8/2010 | Lu | H04W 36/08 |
| | | | | 370/331 |
| 2013/0006469 | A1* | 1/2013 | Green | B60R 21/013 |
| | | | | 701/36 |
| 2013/0269013 | A1* | 10/2013 | Parry | H04L 63/107 |
| | | | | 726/7 |
| 2014/0240591 | A1* | 8/2014 | Rajagopalan | H04N 19/463 |
| | | | | 348/441 |
| 2014/0300739 | A1* | 10/2014 | Mimar | G08B 21/06 |
| | | | | 348/148 |
| 2014/0368601 | A1* | 12/2014 | deCharms | H04L 67/26 |
| | | | | 348/14.02 |
| 2014/0379377 | A1* | 12/2014 | Konig | G16H 10/60 |
| | | | | 705/3 |
| 2015/0127379 | A1* | 5/2015 | Sorenson | G16H 50/20 |
| | | | | 705/3 |
| 2015/0135326 | A1* | 5/2015 | Bailey, Jr. | H04L 63/0861 |
| | | | | 726/25 |
| 2015/0169746 | A1* | 6/2015 | Hatami-Hanza | G06F 16/367 |
| | | | | 706/18 |
| 2015/0271517 | A1* | 9/2015 | Pang | H04N 19/57 |
| | | | | 375/240.02 |
| 2015/0331995 | A1* | 11/2015 | Zhao | G16H 40/67 |
| | | | | 705/2 |
| 2015/0381942 | A1* | 12/2015 | Brewer | H04L 67/22 |
| | | | | 348/143 |
| 2016/0042767 | A1* | 2/2016 | Araya | H04N 7/188 |
| | | | | 386/201 |
| 2016/0179787 | A1* | 6/2016 | Deleeuw | G06F 40/289 |
| | | | | 704/9 |
| 2016/0182707 | A1* | 6/2016 | Gabel | H04M 1/72424 |
| | | | | 455/404.2 |
| 2016/0345260 | A1* | 11/2016 | Johnson | H04N 5/232411 |
| 2016/0358129 | A1* | 12/2016 | Walton | G08G 1/205 |
| 2017/0112391 | A1* | 4/2017 | Stivoric | A61B 5/0022 |
| 2017/0156594 | A1* | 6/2017 | Stivoric | A61B 5/14532 |
| 2017/0181645 | A1* | 6/2017 | Mahalingam | A61B 5/0004 |
| 2018/0060703 | A1* | 3/2018 | Fineis | G01D 21/00 |
| 2018/0184236 | A1* | 6/2018 | Faraone | H04W 8/186 |
| 2018/0330610 | A1* | 11/2018 | Wu | G08G 1/0967 |
| 2019/0013201 | A1 | 1/2019 | Chang et al. | |
| 2019/0042867 | A1* | 2/2019 | Chen | G06N 3/063 |
| 2019/0042870 | A1* | 2/2019 | Chen | H04L 67/12 |
| 2019/0042900 | A1* | 2/2019 | Smith | G06T 7/11 |
| 2019/0045207 | A1 | 2/2019 | Chen et al. | |
| 2019/0124495 | A1* | 4/2019 | Subramaniam | H04W 4/90 |
| 2019/0310891 | A1* | 10/2019 | Baldasaro | G06N 20/00 |
| 2019/0354410 | A1* | 11/2019 | Baldasaro | G06F 9/5072 |
| 2019/0364492 | A1* | 11/2019 | Azizi | H04W 48/16 |

OTHER PUBLICATIONS

Khalastchi, Eliahu, "Anomaly Detection in Unmanned Vehicles: Thesis", The Maverick Group, Department of Computer Science, Bar Ilan University, Ramat Gan, Israel, 2010, 52 pages.

Weber, Marc et al., "Embedded Hybrid Anomaly Detection for Automotive CAN Communication", 9th European Congress on Embedded Real Time Software and Systems (ERTS 2018), Jan. 2018, Toulouse, France, accessed at https://hal.archives-ouvertes.fr/hal-01716805, 11 pages.

* cited by examiner

CONVERGED ROUTING FOR DISTRIBUTED COMPUTING SYSTEMS

CROSS-REFERENCE TO RELATED APPLICATIONS

This patent application is a Continuation-in-Part of U.S. patent application Ser. No. 16/004,299, filed on Jun. 8, 2018, entitled "UBIQUITOUS VISUAL COMPUTING WITNESS", which claims the benefit of U.S. Patent Application No. 62/611,536, filed on Dec. 28, 2017, entitled "VISUAL FOG", the contents of which are hereby expressly incorporated by reference.

FIELD OF THE SPECIFICATION

This disclosure relates in general to the field of distributed computing, and more particularly, though not exclusively, to converged routing for distributed computing systems.

BACKGROUND

In the Internet-of-Things (IoT) era, increasing numbers of sensors are being deployed throughout existing networks. These sensors are often connected at the edge of a network, and thus their data streams typically flow from the edge to the cloud, which is the reverse direction compared to typical data streams. In addition, the data streams from these sensors are often high-volume, continuous, and/or time-sensitive by nature, as is the case with streams of visual data generated by cameras. Accordingly, if many of these streams simultaneously arrive at the same router or node in the network, they may cause network congestion that ultimately leads to a denial of service.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
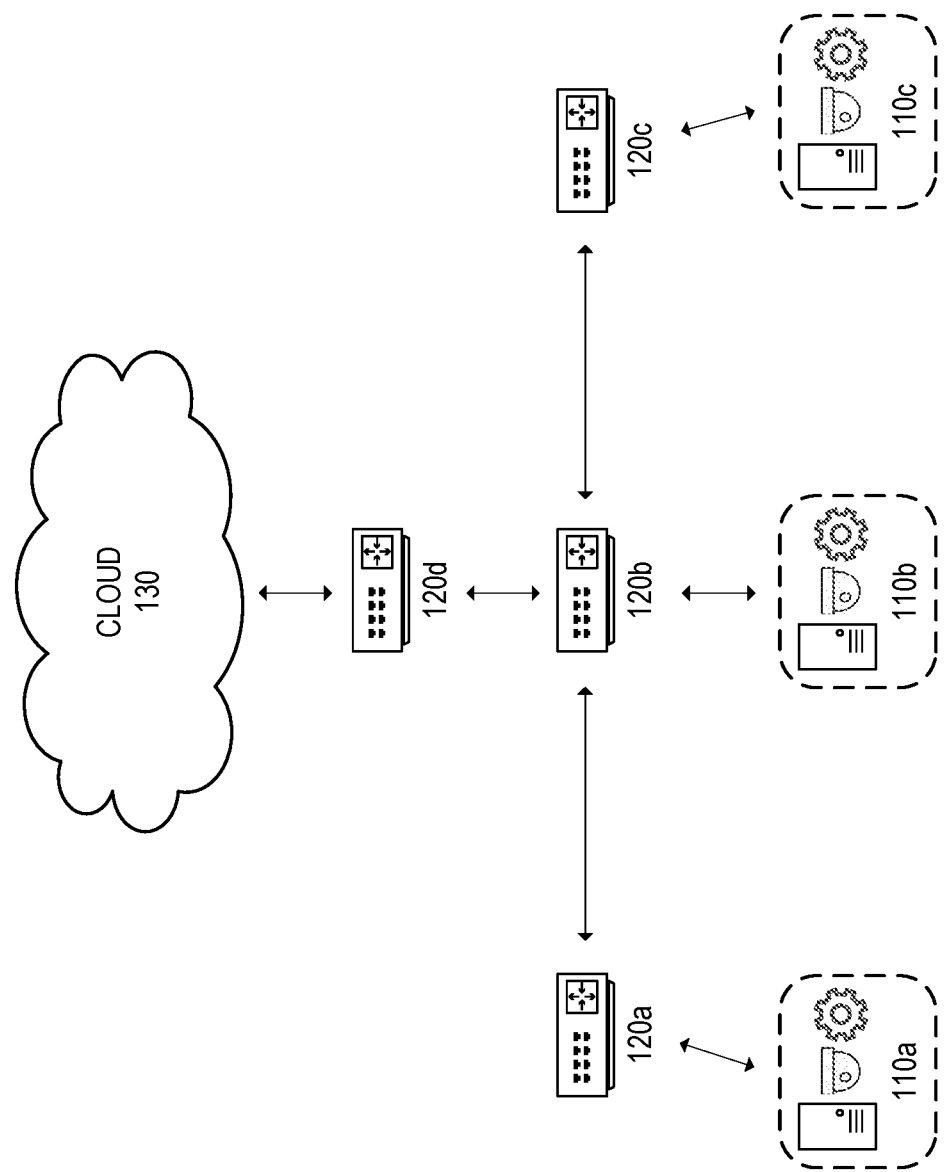
FIG. 1 illustrates an example of a fog computing system implemented using converged routing in accordance with the embodiments described throughout this disclosure.

This patent application is a Continuation-in-Part of U.S. patent application Ser. No. 16/004,299, filed on Jun. 8, 2018, entitled "UBIQUITOUS VISUAL COMPUTING WITNESS", which claims the benefit of U.S. Patent Application No. 62/611,536, filed on Dec. 28, 2017, entitled "VISUAL FOG", the contents of which are hereby expressly incorporated by reference.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Converged Routing for Distributed Computing Systems

FIG. 1 illustrates an example of a fog computing system 100 implemented using converged routing in accordance with the embodiments described throughout this disclosure. For example, fog computing system 100 is a distributed computing system capable of executing computing applications using resources distributed throughout the entire edge-to-cloud pipeline (referred to as the "fog"). Moreover, in the illustrated embodiment, fog computing system 100 includes various converged routing nodes 120a-d distributed throughout the edge-to-cloud pipeline, which are used to route contextually-related data streams more efficiently in order reduce network congestion, as described further below.

In the Internet-of-Things (IoT) era, there are increasing numbers of sensors that are being deployed and connected to communication networks. Because these sensors are joining at the very edges of a network, their data typically flows in the direction from the edge 110 towards the cloud 130, which is the reverse direction from how the network is typically provisioned. Moreover, many of these sensors generate high-volume and time-sensitive data streams (e.g., cameras that stream visual data). For example, the size of a single data stream can be significant from a bandwidth perspective, and the data stream may also be subject to latency constraints for a real-time computing application. In addition, many of these data streams flow continuously by nature.

Accordingly, if many of these high-volume streams simultaneously arrive at and converge upon the same router (as typically happens in hierarchical network topologies), they may not all "fit" within the respective resources associated with the router. For example, in some cases, the data streams may not entirely fit within memory or local storage of the router, or along the next hop in the network. Accordingly, the router may become overloaded if the traffic exceeds its capacity, which may lead to a denial of service (DoS). Moreover, even if the data streams are not high-volume or continuous, if the total number of streams is extremely high, their aggregated bandwidth requirements may similarly exceed the available network resources (both on and off platform).

This problem is one of data implosion (e.g., when there are simply too many data streams competing for router buffer queue resources in the network). Existing congestion control techniques can be used to solve a form of the data implosion problem, but they are insufficient to handle the growing volume of data generated by sensors and devices at the network edge, as described further below.

For example, at the network layer, a typical layer 3 (L3) router has several strategies to manage an oversized incoming data stream: (1) simply do not forward packets that do not fit (e.g., drop those packets); and (2) indirectly signal the source, as well as intermediate routers, of the mismatch in bandwidth needed versus bandwidth available (e.g., via Explicit Congestion Notifications (ECNs) in IP packet headers).

At the transport layer, the transmission control protocol (TCP) uses retransmission timeouts to detect congestion to reduce the flow of packets until the congestion is eased.

At the application layer, a sender of data has an opportunity to: (1) request or negotiate network configuration details up front before the data exchange begins; (2) infer, based on routing hints along the transmission path through the network, how to fit the data over that path or how to transform individual data streams in order to fit the most constrained part of that path; and/or (3) dynamically renegotiate with the application regarding how to fit the data over the network.

The existing congestion control techniques at the network, transport, and application layers, however, are insufficient to handle the growing data implosion problem. For example, the problem is not simply a temporary congestion problem related to peak or busy hour traffic alone—it is the result of a permanent and continuous increase in flows that causes the existing network capacity to be exceeded. While congestion control algorithms seek to minimize data overrun at traditional router nodes in the network, congestion ultimately leads to a growing queue of packets, which increases end-to-end delay. When a queue overflows (e.g., there is no more room to store arriving data), a router begins to drop packets, which can have a big impact on flows that require in-order packet delivery, and may also impact flows that tolerate out-of-order packets but still require reliable delivery, as these flows may have to wait a roundtrip for re-transmission of any packet losses. Delay and/or packet loss can be highly disruptive or unacceptable altogether for some applications, such as a camera mounted on a connected car whose data is meant to be archived as the black box or ground truth for anomalous car or environmental incidents.

The data implosion problem can also be addressed by simply scaling or adding more resources. For example, bandwidth for data streams can be increased by incorporating a bigger and more expensive backbone in the network. Given the rapid growth of the data implosion problem, however, scaling resources is an expensive solution that has become cost-prohibitive and impractical as the problem continues to grow.

Accordingly, in the illustrated embodiment, converged routing nodes 120*a-d* are distributed throughout fog computing system 100 in order to address the growing data implosion problem. For example, converged nodes 120*a-d* are designed to efficiently route, process, and cache high-volume data streams flowing in an N-to-1 manner from the edge to the cloud, which enables continuous transmission of data even when there is a significant disparity between the volume of incoming data and the resources available for outgoing data. This is achieved by collectively processing and caching data streams that are contextually related, such as when multiple cameras capture images from different but overlapping perspectives.

For example, in this context, the term "converged" refers to the following aspects of the solution implemented by converged routing node 120*a-d*:

(1) multiple contextually-related incoming data streams are received by and/or converge upon a converged node 120 (e.g., while the streams are in-flight and en-route to a particular destination), which may then be combined or merged into a single outgoing stream; and (2) an implication of the converged stream processing is that the routing, processing, and compute sub-systems of a converged node 120 may also be "converged," meaning they may be co-designed in hardware in order to support low-latency handling of the data streams (e.g., via an internal shared data bus and/or shared memory that supports zero-copy access).

In some embodiments, for example, a converged node 120 may be implemented by extending the functionality of a traditional layer 3 (L3) router in order to service IoT deployments, which have a need to support reverse data flows at scale (e.g., high-volume, continuous, low-latency, and/or high-density flows) while avoiding the data implosion problem. In particular, the functionality of the traditional L3 router may be extended to comprehend and prevent the implosion of IoT data flows (e.g., the many-to-1 nature of data flowing upstream from a dense camera deployment in a smart space). For example, because multiple incoming streams are often contextually related (e.g., in space and time and possibly other ways), these new "converged node" IoT routers offer a new strategy: process, analyze, and transform related streams together. For example, a converged node takes multiple incoming streams that are contextually related and transforms them into a single output stream by performing transformative compute functions on them (e.g., using analytics, machine learning, and/or artificial intelligence), which essentially serve as a new form of "compression." For example, the related incoming streams may be combined, merged, de-duplicated, compressed, and/or summarized into a new "converged" stream, which may be smaller in size than the original collection of streams. The resulting converged stream may then be routed to the appropriate destination(s), and it may also be stored or cached on the converged node 120 for re-use later in response to subsequent queries or requests associated with the underlying data (e.g., by other contributing and/or nearby stakeholders).

The converged routing embodiments described throughout this disclosure provide numerous advantages, including reduced network congestion and data transmission latency, improved performance for real-time computing applications, and scalability in cost, among other examples.

Moreover, these advantages can be achieved using converged routing in any type of dense IoT deployment suffering from the N-to-1 data implosion problem, regardless of whether the underlying data streams contain visual data or any other type of data.

Further, converged nodes can be deployed and leveraged throughout all hierarchies of an edge-to-cloud network topology (e.g., by telecom service providers and/or cloud service providers), including at the edge, in the cloud, and/or anywhere in between or in the fog. For example, converged routing is highly beneficial in contexts where the end-to-end reverse flows pass through multiple converged nodes, such as when data is organized by geographic region and is (vertically) passed up a hierarchy or multi-tiered topology (e.g., layered administrative domains or clouds), as may be the case for video surveillance, energy monitoring, and/or healthcare use cases, among others.

Additional functionality and embodiments of converged routing nodes are described further in connection with the remaining FIGURES. Accordingly, it should be appreciated that computing system 100 of FIG. 1 may be implemented with any aspects of the embodiments described throughout this disclosure.

Figure 2:
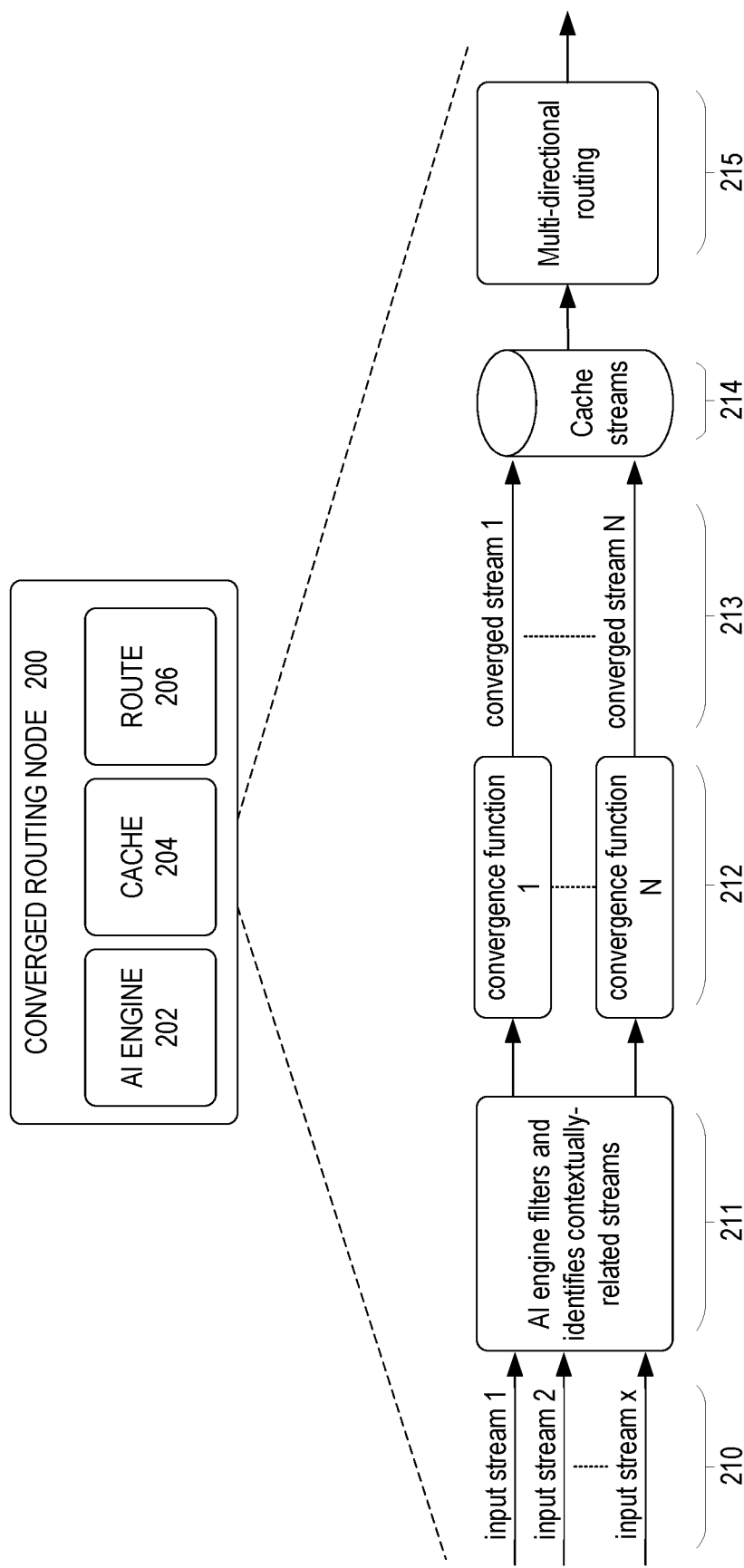
FIG. 2 illustrates an example of the functionality of a converged routing node.

FIG. 2 illustrates an example of the functionality of a converged routing node 200. In some embodiments, for example, converged routing node 200 may be implemented by extending the functionality of an existing layer 3 (L3) router in order to comprehend and manage the growing data implosion problem for IoT deployments in distributed edge and fog computing systems.

In the illustrated embodiment, for example, the functionality of converged node 200 is partitioned into the following functional blocks: artificial intelligence (AI) engine 202, cache 204, and routing logic 206. Moreover, these functional blocks can be used to perform the following functionality:

(1) receive multiple incoming data streams simultaneously (block 210);

(2) process the incoming data streams simultaneously (e.g., using AI engine 202) to identify contextually-related streams and derive functional strategies for "converging" them (block 211):
  (i) look beyond packet headers to analyze if and how a stream is interesting or notable;
  (ii) look beyond packet headers to analyze if and how the streams are related and might be collectively "compressed" in the broader sense of the term (e.g., combined, merged, de-duplicated, compressed, and/or summarized into a new "converged" stream that is smaller in size);
  (iii) identify a functional strategy to emerge with the new converged stream going forward, which may employ different functions in different scenarios (e.g., depending on the particular use case, application, type of data, and/or actual content within the data);
  (iv) dynamically request or fetch the appropriate functions/services/methods to be performed;

(3) perform the selected "convergence function(s)" on contextually-related data streams (block 212) to transform them into converged streams (block 213);

(4) cache the converged streams for subsequent reuse (block 214) (e.g., cache the new stream for re-use by contextually-related stakeholders, particularly those that are mobile, wireless, low-power, and/or proximate, for greater resource efficiency);

(5) route the converged streams to their corresponding destinations (block 215):
  (i) route the new stream in the reverse direction, which is where it was headed;
  (ii) provide the option to route the new stream in other directions, e.g., within a local edge cloud and/or across neighboring clouds.

In various embodiments, converged node 200 may employ a variety of approaches in order to determine whether streams are contextually related. For example, in some embodiments, related streams may be identified based on correlations derived from the name of the content of multiple different streams.

In an information-centric networking (ICN) context, for example, all the streams that respond to a specific ICN interest packet asking for data with a particular content "name" are considered contextually-related. The system could re-use the entries in an ICN pending interest table (PIT) as the entries in a directory for "contextually-related" groups of streams.

In a non-ICN context, the system still can leverage the name of the content or name-like attributes to organize streams into contextually-related groups, such as based on the URL/URI of the content, transport packet header tuples (e.g., sender and receiver addresses and port numbers), and/or streams that originate from the same subnet address or subnet prefix. Deep packet inspection can also be used to identify related streams by inspecting their actual content. In some embodiments, however, name-based techniques may be preferred or prioritized over deep packet inspection in order to avoid or minimize performing resource-intensive packet inspection.

Further, in some embodiments, related streams may be identified based on a particular region of interest. For example, streams that originate within a "region of interest"—or a particular proximity in space and time—may be organized into contextually-related groups of packets (e.g., video streams captured by cameras located near each other).

In some embodiments, converged node 200 may implement the following extensions to the functionality of a traditional L3 router:

(1) analyzing data within data flows beyond the packet headers;

(2) defining what it means for data to be contextually-related (e.g., within a geographic region of interest, owned by the same vendor, running the same version of anti-malware software, and so forth);

(3) collectively processing N contextually-related incoming data flows;

(4) recommending or selecting a function to perform across these flows to "compress" them before routing/caching them;

(5) transforming the N streams into a single, new, less resource-consuming data flow;

(6) potentially caching or storing the new stream locally (e.g., for request and retrieval by nearby proximate sensors that may have contributed to the new stream and/or by those who have an interest in the results);

(7) routing the new data stream to its next intended upstream destination, which may be in the Northward direction in which the data was originally flowing, but may also include broader dissemination, such as in the East-West direction to peer clouds or in the Southward direction to interested parties.

These extensions differ from traditional L3 router solutions in that they require the router to look inside the data stream beyond the packet header and focus on the content or payload of the packet (e.g., rather than focusing only on the packet header, which is the more traditional focus of an L3 router). Additionally, these extensions are performed while the data streams are in-flight versus post-facto. For example, converged routing node 200 performs an N-to-1 transformation, which may represent a range of processing capabilities, including but not limited to: compression, encryption, de-duplication, transcoding, labeling, aggregation, grouping some flows into larger flows based on contextual commonality, sub-sampling, combination (e.g., stitching), and/or analytics (e.g., which broadly refers to any act of analysis, such as statistical analysis, machine Learning (ML), deep learning (DL), and/or any other form of artificial intelligence).

In some cases, for example, these transformations may convert the data contained within related streams from its original format into a new format altogether. For example, with respect to visual data, AI and/or ML analytics may be used to summarize and/or label certain phenomena observed within the data (e.g., using object recognition and object counting techniques), thus producing a new stream of metadata that tracks the appearance of interesting objects, events, or circumstances within the visual field of view.

Figure 3:
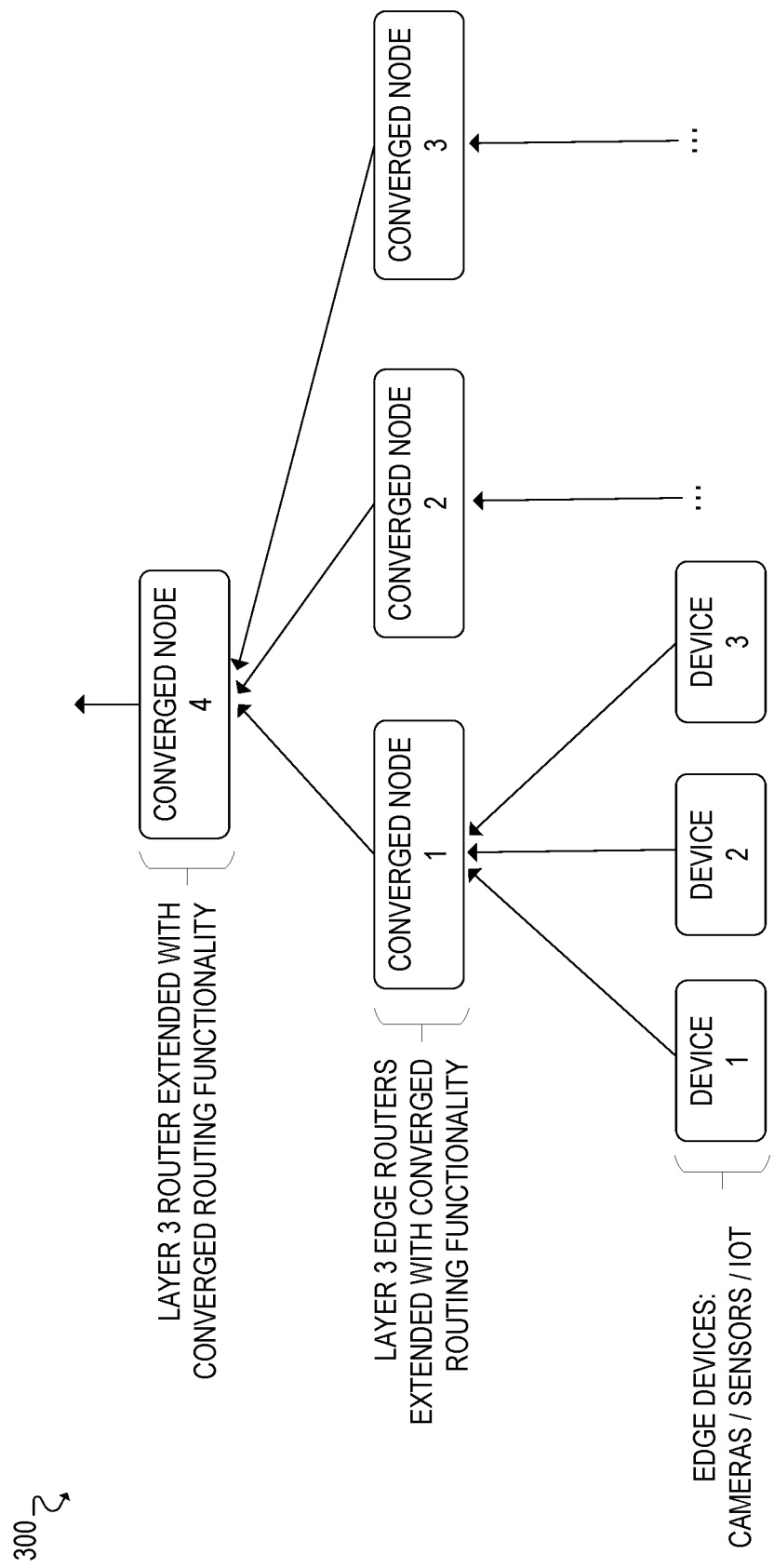
FIG. 3 illustrates an example of the network topology for a reverse content delivery network (rCDN) implemented using converged routing.

FIG. 3 illustrates an example of the network topology for a reverse content delivery network (rCDN) 300 implemented using converged routing. In rCDN 300, for example, data streams flow from the edge to the cloud in an N-to-1 manner, which is the reverse direction compared to typical networks. In typical networks, this reverse flow may result in data implosion, particularly when many edge devices are streaming high-volume data flows simultaneously (e.g., IoT devices, sensors, cameras), which may cause network congestion and lead to a denial of service.

In rCDN 300, however, the converged routing functionality described throughout this disclosure (e.g., processing-caching-routing of contextually-related data streams) is leveraged throughout the network topology in order to alleviate the data implosion problem for reverse data flows. For example, in the illustrated embodiment, rCDN 300 includes multiple converged nodes at various hierarchies of the network topology, which essentially serve as routers with extended functionality for routing reverse data flows more efficiently.

In this manner, data streams transmitted within rCDN 300 may repeatedly encounter converged nodes in a cascading fashion multiple times throughout the end-to-end transmission path, and the data streams may be converged with other contextually-related streams at each converged node along the transmission path, until a resulting converged data stream ultimately reaches its final destination(s) (e.g., as might be the case in a digital surveillance system that supports multiple levels of N-to-1 converged data flows). In this manner, by converging contextually-related data streams together throughout the end-to-end path, the streams are routed in a more efficient manner that consumes less bandwidth.

Figure 4:
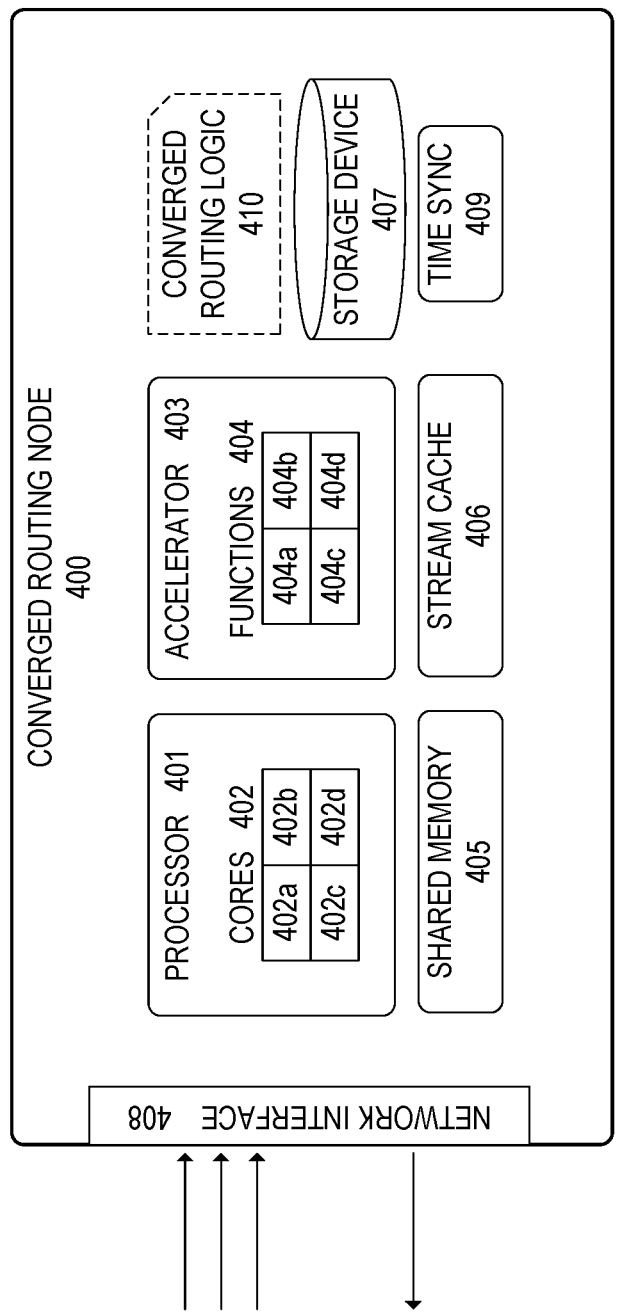
FIG. 4 illustrates an example embodiment of a converged routing node.

FIG. 4 illustrates an example embodiment of a converged routing node 400. In some embodiments, for example, the components of converged routing node 400 may be used to implement the converged routing functionality described throughout this disclosure. In the illustrated embodiment, converged routing node 400 includes processor 401, accelerator 403, shared memory 405, data stream cache 406, storage device 407, network interface 408, time synchronizer 409, and converged routing logic 410, as described further below. In various embodiments, however, the underlying components and functionality of converged routing node 400 may be combined, separated, and/or distributed across any type and/or number of devices and components.

Processor 401 may be used to execute logic and/or instructions designed to implement the functionality of converged routing node 400 (e.g., logic and/or instructions of converged routing logic 410). In the illustrated embodiment, processor 401 is a multi-core processor with a plurality of processing cores 402a-d. In various embodiments, processor 401 may be implemented using any suitable type and/or combination of processing devices.

Accelerator 403 may be used to accelerate certain functionality of converged routing node 400, such as processing and analytics used to identify contextually-related data streams (e.g., using artificial intelligence and/or machine learning algorithms), convergence functions used to transform sets of related data streams into converged data streams, routing and infrastructure functions, and so forth. In the illustrated embodiment, for example, accelerator 403 includes a plurality of accelerated function units 404a-d, each of which may be designed, configured, and/or programmed to accelerate a particular function for node 400. In various embodiments, accelerator 403 may be implemented using any suitable type and/or combination of logic and/or circuitry, including field-programmable gate arrays (FPGAs), application-specific integrated circuits (ASICs), and/or any other programmable or fixed-function integrated circuits or processing devices.

Shared memory 405 may be used to store instructions and/or data used by components of converged routing node 400. In some cases, for example, shared memory 405 may store incoming data streams that are received by converged node 400 via network interface 408. In various embodiments, shared memory 405 may be implemented using any suitable type and/or combination of volatile and/or non-volatile memory components (e.g., random access memory (RAM)).

Data stream cache 406 may be used to cache converged data streams that are generated (e.g., by converged routing logic 410) from sets of contextually-related data streams received by converged routing node 400. In this manner, upon receiving subsequent requests associated with the converged data streams, the converged streams may be quickly retrieved from cache 406 and routed to the appropriate destinations. In various embodiments, data stream cache 406 may be implemented using any suitable type and/or combination of low-latency memory.

Storage device 407 may be used to store data and/or instructions used by components of converged routing node 400 (e.g., routing tables, incoming and/or outgoing data streams, converged data streams, converged routing logic 410). In various embodiments, storage device 407 may be implemented using any suitable type and/or combination of devices that provide persistent data storage (e.g., hard disk drives (HDD), solid state drives (SSD)).

In some embodiments, for example, cache 406 may provide temporary or ephemeral storage that is speedier to access, while storage device 407 may provide persistent storage that is more permanent in nature. Over time, certain data originally stored within cache 406 may be migrated to storage device 407 in order to be stored more permanently, such as when an event within a data stream stored on cache 406 is deemed important and thus needs to be preserved more permanently on storage device 407 (e.g., an event that serves as evidence for an anomaly or incident that requires an immediate response and/or subsequent review and evaluation at a later time).

Network interface 408 may be used by converged routing node 400 to communicate with other components and devices over one or more networks (e.g., edge computing devices, IoT devices, sensors, gateways, routers, servers, cloud-based resources). In various embodiments, network interface 408 may be implemented using any suitable type and/or combination of communication interfaces and technologies (e.g., wired and/or wireless).

Time synchronizer 409 may be used to coordinate and synchronize the clock of converged routing node 400 with other network devices (e.g., to within a microsecond in some cases). In this manner, converged routing node 400 can reliably synchronize multiple data streams from different sources in order to facilitate analysis and transformation of data streams that are contextually related. In some embodiments, for example, time synchronizer 409 may utilize high-resolution timestamps to perform time-sensitive coordination across multiple data streams and further to ensure that any time-constrained delivery requirements are met for those streams. As an example, time synchronization may be leveraged to synchronize multiple contextually-related data streams for the purpose of converging them into a single converged data stream (e.g., synchronizing related video streams in order to stitch them together to form a single video stream). In various embodiments, time synchronizer 409 may be implemented using any suitable type and/or combination of circuitry and/or logic for performing time synchronization. In some embodiments, for example, time synchronizer 409 may be implemented using Intel® Time Coordinated Computing Technology (Intel® TCC Technology).

Converged routing logic 410 includes logic and/or instructions that can be executed by processor 401 to implement the converged routing functionality described throughout this disclosure.

In various embodiments, the functionality of converged routing node 400 may be implemented using any combination of hardware and/or software. In some embodiments, for example, the functionality of converged routing node 400 may be implemented primarily in software (e.g., as a software-defined router). In other embodiments, the functionality of converged routing node 400 may be implemented using special-purpose hardware, including a zero-copy hardware architecture and/or hardware accelerators implemented using FPGAs and/or ASICs.

For example, converged routing node 400 may be implemented using a zero-copy hardware architecture that enables data to be accessed and shared by all subsystems of node 400 without copying or moving the data to and from each subsystem (or in other words, moving the functionality/service/operation to the data itself, subscribing to the philosophy of "moving the compute to the data"). In this manner, data streams can be received and processed by different subsystems of node 400 (e.g., processor 401, accelerator 403, network interface 408) without incurring additional latency associated with data transfers between subsystems. In some embodiments, for example, the zero-copy design may include a shared data bus or interconnect that connects the respective subsystems and components of node 400 to a variety of shared resources, such as shared memory 405, stream cache 406, and/or other internal caches (e.g., processor 401 and/or accelerator 403 caches), among other examples. In this manner, the zero-copy design implements a coherency domain that tightly couples components of node 400 and enables them to share access to a coherent memory space, thus improving the overall performance of node 400.

Figure 5:
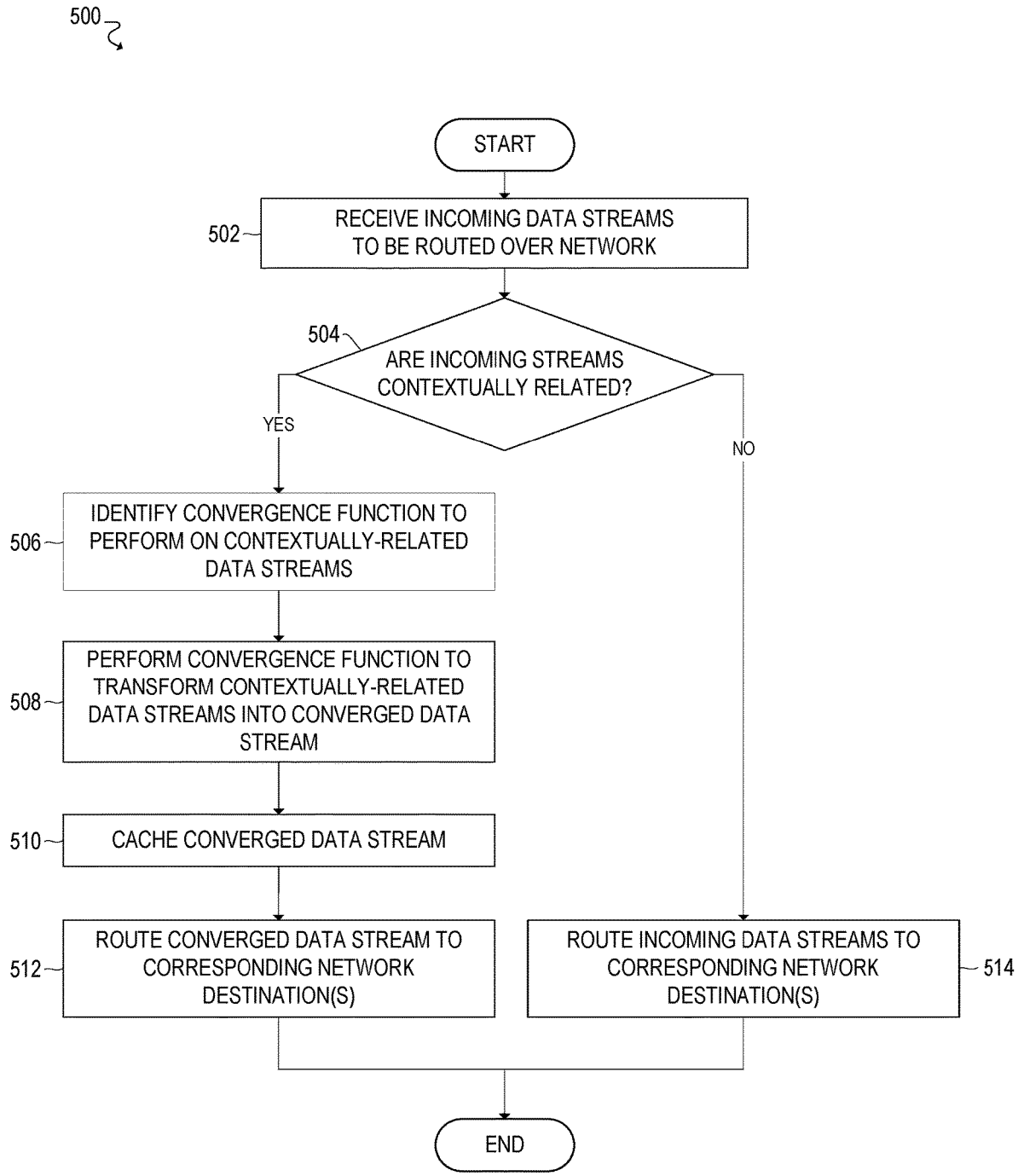
FIG. 5 illustrates a flowchart for an example embodiment of converged routing for contextually-related data streams.

FIG. 5 illustrates a flowchart 500 for an example embodiment of converged routing for contextually-related data streams. In some cases, flowchart 500 may be implemented using embodiments of the converged routing node described throughout this disclosure.

In some embodiments, for example, the converged routing node may be deployed within a distributed or fog computing system somewhere along the edge-to-cloud pipeline. Moreover, the converged routing node may be implemented as either a standalone node or as new functionality of an existing node in the pipeline (e.g., extended functionality of an existing layer 3 router, or entirely new functionality of an existing edge, fog, or cloud computing device).

The flowchart begins at block 502, where the converged node receives (e.g., via a network interface) a plurality of incoming data streams that need to be routed over a network. In some cases, for example, the data streams may correspond to or contain sensor data captured by a plurality of sensors within the distributed computing system, such as visual data (e.g., images or videos) captured by a plurality of cameras. Visual data can include any type of data associated with a visual representation of information, including pixels of images or videos (e.g., raw or compressed pixels), visual metadata (e.g., metadata describing the contents of images or videos), visual feature vectors (e.g., feature vectors extracted from images or videos), and so forth.

Moreover, in some embodiments, the incoming data streams may be stored within a shared memory of the converged node, which may be used to provide zero-copy access to the incoming data streams. In this manner, the incoming data streams can be accessed via the shared memory by the underlying components and subsystems of the converged node without copying or moving the incoming streams between those components and subsystems.

The flowchart then proceeds to block 504, where the converged node analyzes (e.g., via one or more processors) the incoming data streams to determine whether any of them are contextually related. In some cases, for example, the converged node may identify a set of related data streams based on the analysis of the incoming streams. For example, in some embodiments, the converged node may leverage artificial intelligence and/or machine learning techniques in order to determine that the set of related data streams are contextually related.

In some cases, for example, the set of related data streams may contain or otherwise correspond to a respective portion of sensor data that is contextually related.

For example, it may be determined that the set of related data streams are contextually related because they correspond to or contain a respective portion of sensor data that was captured within a particular proximity in location and time (e.g., sensor data captured within the same geographical area or location during a particular window of time).

As another example, it may be determined that the set of related data streams are contextually related based on the type of content or sensor data within the respective streams. For example, it may be determined that the set of related data streams contain the same or similar types of content or sensor data. In some embodiments, for example, the type of content within the data streams may be derived based on metadata associated with the streams (e.g., within packet headers) and/or based on an analysis of the actual content or payload of the streams (e.g., using deep packet inspection (DPI) techniques). In some cases, for example, the data streams may include metadata containing names or identifiers associated with their underlying content (e.g., content names). For example, names or identifiers may be contained in uniform resource identifiers (URI) and/or uniform resource locators (URL) that are used to access the data streams. As another example, in an information-centric network (ICN), names are assigned to the underlying content within data streams in order to route content throughout the network based on its corresponding name. For example, in an ICN network, a node broadcasts an "interest packet" in order to request or solicit data that matches a particular "name" specified within the packet. Moreover, the names of data requested by these interest packets are tracked in pending interest tables (PIT) maintained by the nodes in the network. Thus, the names in a pending interest table (PIT) of an ICN network could be used to identify the type of content within the data streams.

Accordingly, in some embodiments, the "content names" associated with the incoming data streams may be identified, and it may be determined that the set of related data streams are contextually related based on the content names.

If no contextually-related streams are identified at block 504, the flowchart proceeds to block 514 to route the incoming data streams to their corresponding network destination(s).

However, if a set of contextually-related data streams is identified at block 504, the flowchart proceeds to block 506, where the converged node identifies a particular convergence function to perform on the set of related data streams in order to transform them into a converged data stream that is smaller in size than the original set of related data streams (e.g., by merging, consolidating, compressing, fusing, and/ or summarizing content with the set of related data streams). For example, in various cases, certain streams may be merged or fused, compressed (e.g., using video compression techniques), converted into a lower resolution and/or lower frequency format (e.g., fewer pixels per frame and/or fewer frames), converted into a different format altogether (e.g., by performing analytics on the related streams to summarize their contents as metadata), filtered to remove redundant, duplicative, and/or unnecessary content across the streams, and so forth.

In some embodiments, for example, the converged node is capable of performing a variety of different convergence functions that may be designed for different types of content or sensor data, applications, and/or use cases. Thus, the converged node may analyze the set of related data streams to identify or select a particular convergence function to perform on those streams. In some cases, for example, a convergence function may be selected based on the type and/or size of content within the related data streams (e.g., visual data, audio, IoT sensor data), the particular application and/or use case associated with the related data streams, and so forth. Further, in some cases, a particular convergence function for the related data streams may be explicitly requested within the data streams themselves or by an associated computing application.

The decrease in size of the resulting converged data stream (e.g., the amount of compression achieved) can vary depending on the circumstances, including the underlying contents and relationship of the related streams and the particular convergence function(s) used to converge those streams. In some cases, for example, the converged data stream may be significantly smaller than the original set of related data streams, while in other cases it may only be marginally smaller. For example, in some cases, snapshots of the related data streams may be preserved at a particular temporal frequency and/or spatial resolution. For example, the snapshots may preserve 1 out of every $n^{th}$ packet of the related data streams (e.g., lower frequency), or alternatively the snapshots may preserve 1 out of every $n^{th}$ piece of data within each packet (e.g., lower resolution), thus producing a converged stream that is $$\frac{1}{n}$$

of the size of the original set of related data streams. Conversely, the snapshots may discard 1 out of every $n^{th}$ packet of the related data streams (e.g., lower frequency), or alternatively the snapshots may discard 1 out of every $n^{th}$ piece of data within each packet (e.g., lower resolution), thus producing a converged stream that is $$\frac{n-1}{n}$$

of the size of the original set of related data streams.

The flowchart then proceeds to block 508, where the converged node performs the identified convergence function in order to transform the set of related data streams into a converged data stream.

As an example, the convergence function may include a compression function for compressing the set of related data streams (e.g., using a particular compression technique associated with the underlying type of data).

Thus, the converged node may generate the converged data stream by compressing the set of related data streams using the compression function.

As another example, the convergence function may include a sensor fusion function for combining or "fusing" the portion of sensor data corresponding to or contained in the set of related data streams. Thus, the converged node may generate the converged data stream by combining the portion of sensor data using the sensor fusion function. In some cases, for example, sensor fusion may be used to combine multiple related streams of sensor data into a smaller converged or fused stream of sensor data (e.g., smaller in size than original collection of streams). Moreover, in some embodiments, related data streams may be combined or fused using sensor fusion multiple times throughout transmission in a cascading fashion. For example, multiple converged streams generated by converging different sets of related data streams may themselves be converged together into a single converged stream that is smaller in size than the original converged streams.

As another example, the convergence function may include a video stitching function for combining, fusing, or "stitching" together visual data (e.g., captured by a plurality of cameras) contained in the set of related data streams. Thus, the converged node may generate the converged data stream by combining or stitching the visual data captured by the cameras using the video stitching function.

As another example, the convergence function may include an analytic function for analyzing and/or summarizing content within the set of related data streams. Thus, the converged node may generate the converged data stream by analyzing the content within the set of related data streams using the analytic function, generating metadata corresponding to a summary of the content output by the analytic function, and including the metadata in the converged data stream.

As another example, the convergence function may include an object detection function for detecting one or more objects within visual data (e.g., captured by a plurality of cameras) contained in the set of related data streams. Thus, the converged node may generate the converged data stream by detecting one or more of the objects within the visual data using the object detection function, generating metadata corresponding to or describing the detected objects, and including the metadata in the converged data stream.

As another example, the convergence function may include a filter function for discarding one or more redundant data streams (or portions thereof) from the set of related data streams. Thus, the converged node may generate the converged data stream by identifying one or more redundant data streams (or portions thereof) using the filter function, and discarding those redundant data streams (or portions thereof) from the resulting converged data stream. In some cases, for example, certain streams may contain visual data that is redundant or duplicative to that of another stream (e.g., streams containing visual data captured by cameras that are near each other). Accordingly, one copy of that visual data may be included in the converged data stream (e.g., the copy with the highest video quality), while the remaining duplicative copies may be discarded.

Moreover, in some embodiments, the processor(s) of the converged node may include an accelerator circuit to accelerate performance of the convergence function(s) supported by the converged node. In some embodiments, for example, the accelerator circuit may be implemented using a field-programmable gate array (FPGA) (e.g., thus enabling the convergence functions to be programmable within the FPGA), an application-specific integrated circuit (ASIC), and/or any other type integrated circuitry and/or logic.

The flowchart then proceeds to block 510, where the converged node stores the converged data stream in a cache (e.g., at least temporarily). In this manner, the converged node can access or retrieve the converged data stream via the cache for subsequent routing of the converged data stream to one or more additional destinations over the network, as needed (e.g., upon receiving subsequent requests or interest packets associated with the converged data stream).

The flowchart then proceeds to block 512, where the converged node routes (e.g., via a network interface) the converged data stream to one or more corresponding destinations over the network.

At this point, the flowchart may be complete. In some embodiments, however, the flowchart may restart and/or certain blocks may be repeated. For example, in some embodiments, the flowchart may restart at block 502 to continue receiving, converging, caching, and/or routing incoming data streams (e.g., incoming streams of a visual nature that may be contextually related).

Example Internet-of-Things (IoT) Implementations

FIGS. 6-9 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 6:
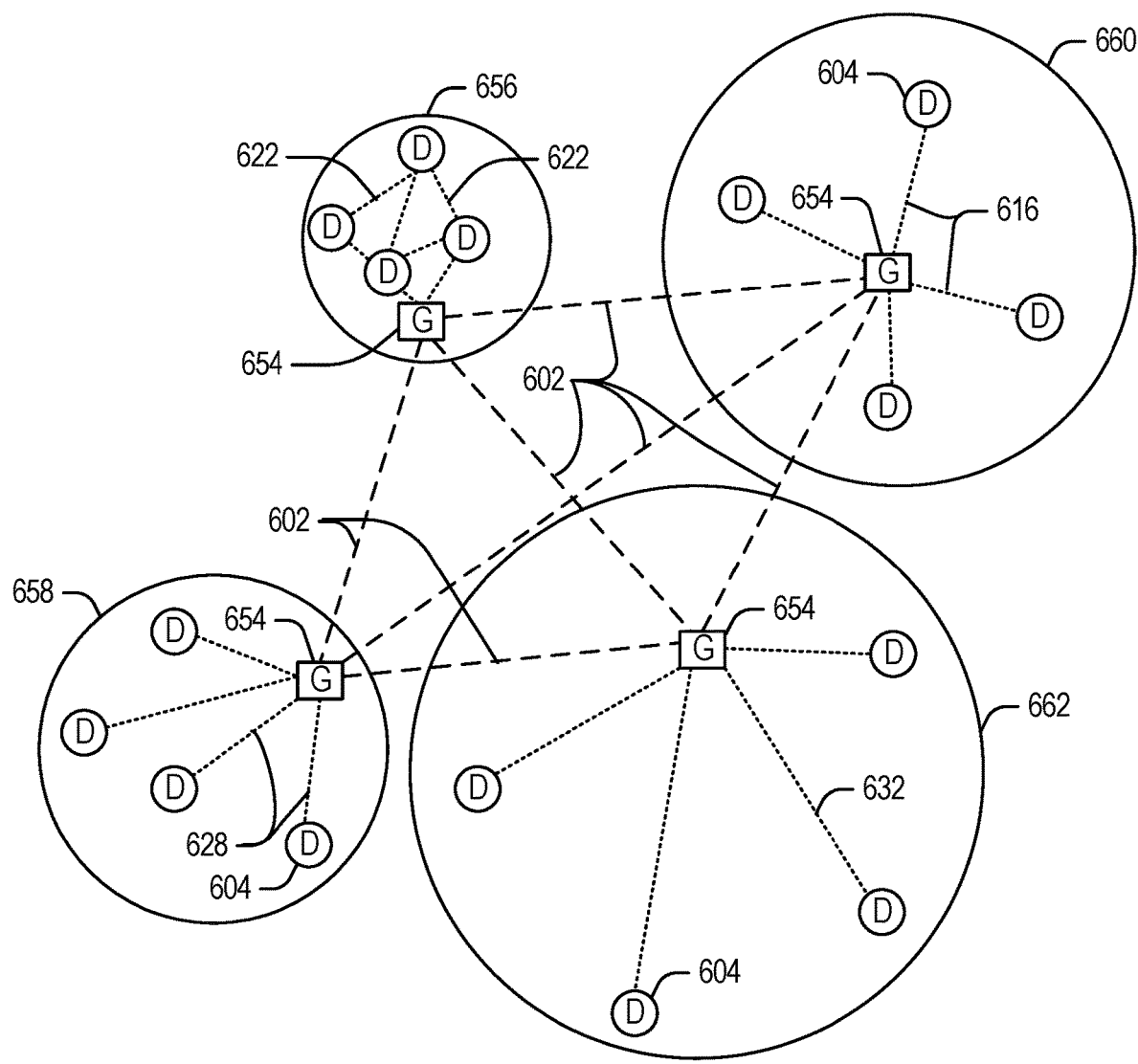
FIGS. 6, 7, 8, and 9 illustrate examples of Internet-of-Things (IoT) networks and architectures that can be used in accordance with certain embodiments.

FIG. 6 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 6-9, present a number of new challenges in a heterogeneous network of connectivity comprising a combination of wired and wireless technologies.

FIG. 6 specifically provides a simplified drawing of a domain topology that may be used for a number of internet-of-things (IoT) networks comprising IoT devices 604, with the IoT networks 656, 658, 660, 662, coupled through backbone links 602 to respective gateways 654. For example, a number of IoT devices 604 may communicate with a gateway 654, and with each other through the gateway 654. To simplify the drawing, not every IoT device 604, or communications link (e.g., link 616, 622, 628, or 632) is labeled. The backbone links 602 may include any number of wired or wireless technologies, including optical networks, and may be part of a local area network (LAN), a wide area network (WAN), or the Internet. Additionally, such communication links facilitate optical signal paths among both IoT devices 604 and gateways 654, including the use of MUXing/deMUXing components that facilitate interconnection of the various devices.

The network topology may include any number of types of IoT networks, such as a mesh network provided with the network 656 using Bluetooth low energy (BLE) links 622. Other types of IoT networks that may be present include a wireless local area network (WLAN) network 658 used to communicate with IoT devices 604 through IEEE 802.11 (Wi-Fi®) links 628, a cellular network 660 used to communicate with IoT devices 604 through an LTE/LTE-A (4G) or 5G cellular network, and a low-power wide area (LPWA) network 662, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 604, such as over the backbone links 602, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 656, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 658, for instance, may use systems that perform standards conversion to provide multi-standard connectivity, enabling IoT devices 604 using different protocols to communicate. Further systems may provide seamless interconnectivity across a multi-standard infrastructure comprising visible Internet resources and hidden Internet resources.

Communications in the cellular network 660, for instance, may be enhanced by systems that offload data, extend communications to more remote devices, or both. The LPWA network 662 may include systems that perform non-Internet protocol (IP) to IP interconnections, addressing, and routing. Further, each of the IoT devices 604 may include the appropriate transceiver for wide area communications with that device. Further, each IoT device 604 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 7 below.

Figure 7:
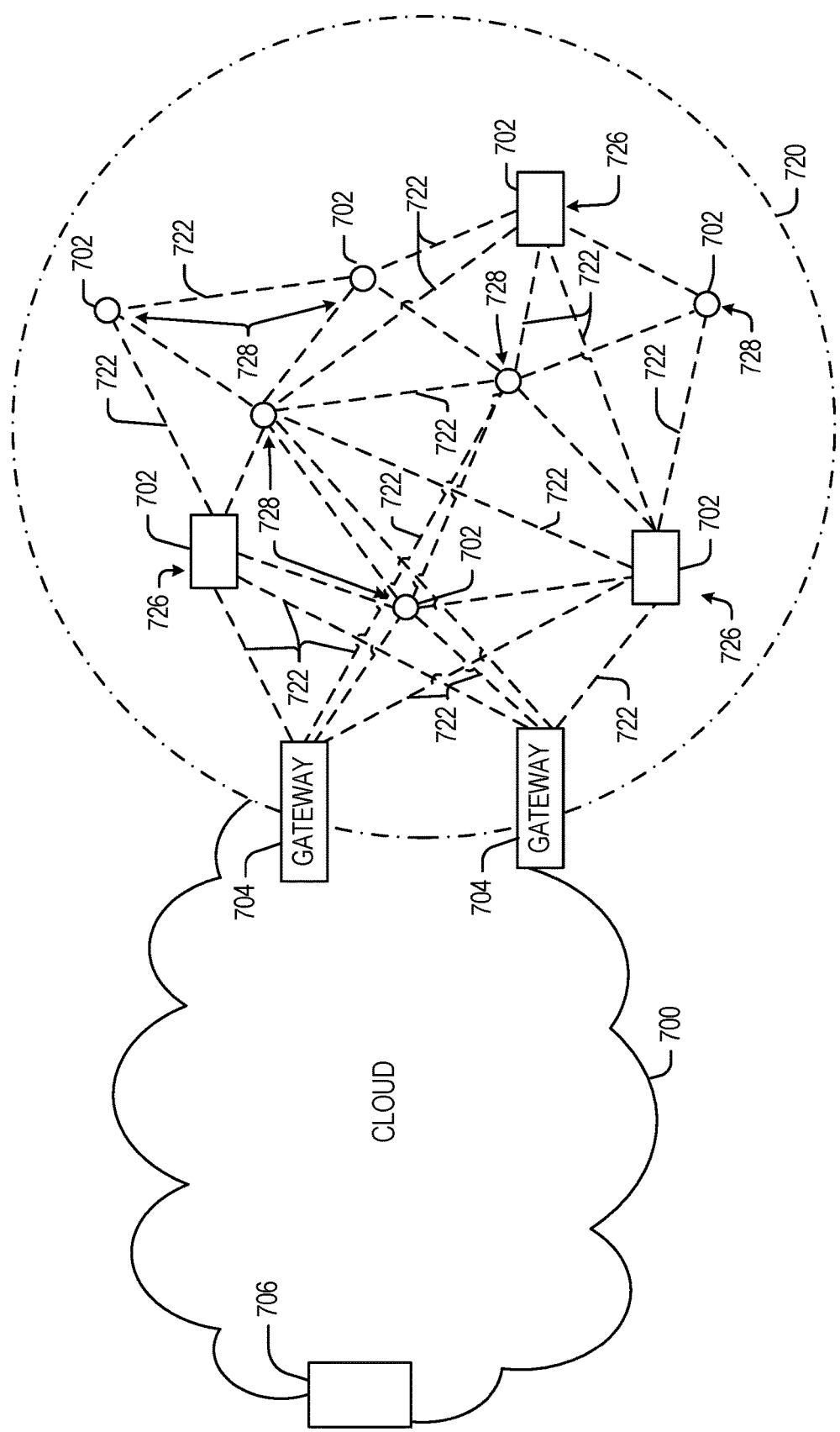

FIG. 7 illustrates a cloud computing network in communication with a mesh network of IoT devices (devices 702) operating as a fog device at the edge of the cloud computing network. The mesh network of IoT devices may be termed a fog 720, operating at the edge of the cloud 700. To simplify the diagram, not every IoT device 702 is labeled.

The fog 720 may be considered to be a massively interconnected network wherein a number of IoT devices 702 are in communications with each other, for example, by radio links 722. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 702 are shown in this example, gateways 704, data aggregators 726, and sensors 728, although any combinations of IoT devices 702 and functionality may be used. The gateways 704 may be edge devices that provide communications between the cloud 700 and the fog 720, and may also provide the backend process function for data obtained from sensors 728, such as motion data, flow data, temperature data, and the like. The data aggregators 726 may collect data from any number of the sensors 728, and perform the back-end processing function for the analysis. The results, raw data, or both may be passed along to the cloud 700 through the gateways 704. The sensors 728 may be full IoT devices 702, for example, capable of both collecting data and processing the data. In some cases, the sensors 728 may be more limited in functionality, for example, collecting the data and allowing the data aggregators 726 or gateways 704 to process the data.

Communications from any IoT device 702 may be passed along a convenient path (e.g., a most convenient path) between any of the IoT devices 702 to reach the gateways 704. In these networks, the number of interconnections provide substantial redundancy, allowing communications to be maintained, even with the loss of a number of IoT devices 702. Further, the use of a mesh network may allow IoT devices 702 that are very low power or located at a distance from infrastructure to be used, as the range to connect to another IoT device 702 may be much less than the range to connect to the gateways 704.

The fog 720 provided from these IoT devices 702 may be presented to devices in the cloud 700, such as a server 706, as a single device located at the edge of the cloud 700, e.g., a fog device. In this example, the alerts coming from the fog device may be sent without being identified as coming from a specific IoT device 702 within the fog 720. In this fashion, the fog 720 may be considered a distributed platform that provides computing and storage resources to perform processing or data-intensive tasks such as data analytics, data aggregation, and machine-learning, among others.

In some examples, the IoT devices 702 may be configured using an imperative programming style, e.g., with each IoT device 702 having a specific function and communication partners. However, the IoT devices 702 forming the fog device may be configured in a declarative programming style, allowing the IoT devices 702 to reconfigure their operations and communications, such as to determine needed resources in response to conditions, queries, and device failures. As an example, a query from a user located at a server 706 about the operations of a subset of equipment monitored by the IoT devices 702 may result in the fog 720 device selecting the IoT devices 702, such as particular sensors 728, needed to answer the query. The data from these sensors 728 may then be aggregated and analyzed by any combination of the sensors 728, data aggregators 726, or gateways 704, before being sent on by the fog 720 device to the server 706 to answer the query. In this example, IoT devices 702 in the fog 720 may select the sensors 728 used based on the query, such as adding data from flow sensors or temperature sensors. Further, if some of the IoT devices 702 are not operational, other IoT devices 702 in the fog 720 device may provide analogous data, if available.

Figure 8:
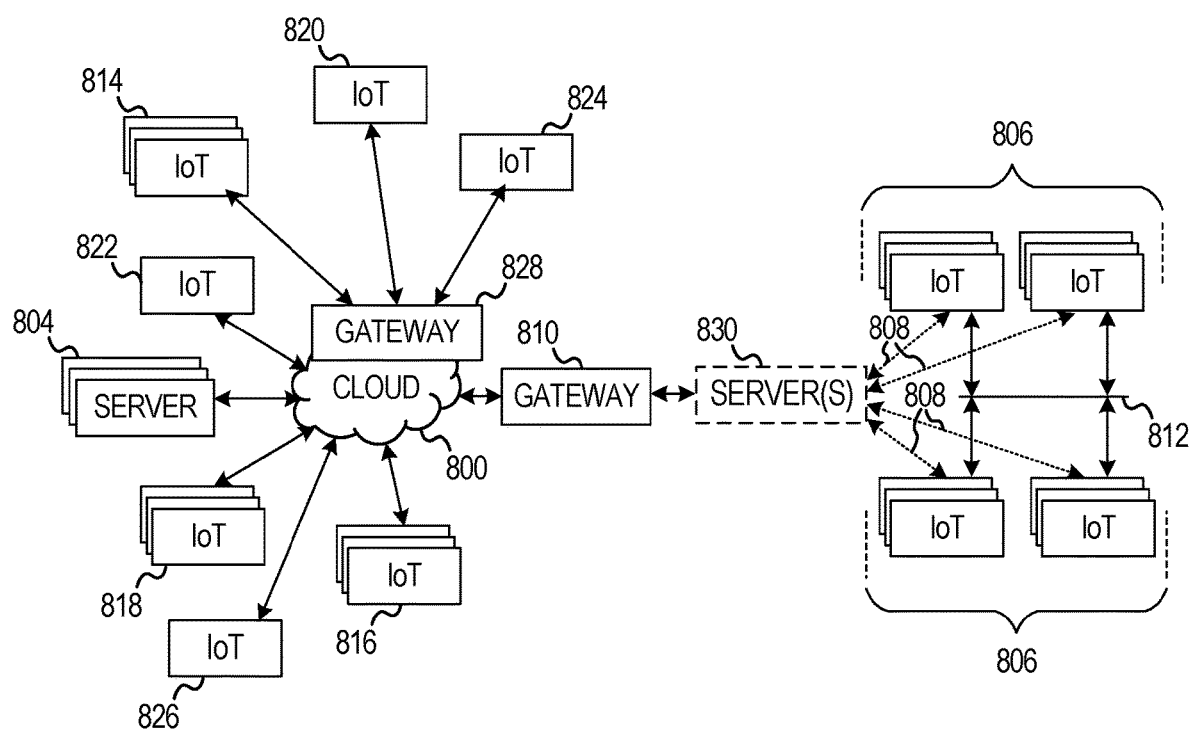

FIG. 8 illustrates a drawing of a cloud computing network, or cloud 800, in communication with a number of Internet of Things (IoT) devices. The cloud 800 may represent the Internet, or may be a local area network (LAN), or a wide area network (WAN), such as a proprietary network for a company. The IoT devices may include any number of different types of devices, grouped in various combinations. For example, a traffic control group 806 may include IoT devices along streets in a city. These IoT devices may include stoplights, traffic flow monitors, cameras, weather sensors, and the like. The traffic control group 806, or other subgroups, may be in communication with the cloud 800 through wired or wireless links 808, such as LPWA links, optical links, and the like. Further, a wired or wireless sub-network 812 may allow the IoT devices to communicate with each other, such as through a local area network, a wireless local area network, and the like. The IoT devices may use another device, such as a gateway 810 or 828 to communicate with remote locations such as the cloud 800; the IoT devices may also use one or more servers 830 to facilitate communication with the cloud 800 or with the gateway 810. For example, the one or more servers 830 may operate as an intermediate network node to support a local edge cloud or fog implementation among a local area network. Further, the gateway 828 that is depicted may operate in a cloud-to-gateway-to-many edge devices configuration, such as with the various IoT devices 814, 820, 824 being constrained or dynamic to an assignment and use of resources in the cloud 800.

Other example groups of IoT devices may include remote weather stations 814, local information terminals 816, alarm systems 818, automated teller machines 820, alarm panels 822, or moving vehicles, such as emergency vehicles 824 or other vehicles 826, among many others. Each of these IoT devices may be in communication with other IoT devices, with servers 804, with another IoT fog device or system (not shown, but depicted in FIG. 7), or a combination therein. The groups of IoT devices may be deployed in various residential, commercial, and industrial settings (including in both private or public environments).

As can be seen from FIG. 8, a large number of IoT devices may be communicating through the cloud 800. This may allow different IoT devices to request or provide information to other devices autonomously. For example, a group of IoT devices (e.g., the traffic control group 806) may request a current weather forecast from a group of remote weather stations 814, which may provide the forecast without human intervention. Further, an emergency vehicle 824 may be alerted by an automated teller machine 820 that a burglary is in progress. As the emergency vehicle 824 proceeds towards the automated teller machine 820, it may access the traffic control group 806 to request clearance to the location, for example, by lights turning red to block cross traffic at an intersection in sufficient time for the emergency vehicle 824 to have unimpeded access to the intersection.

Clusters of IoT devices, such as the remote weather stations 814 or the traffic control group 806, may be equipped to communicate with other IoT devices as well as with the cloud 800. This may allow the IoT devices to form an ad-hoc network between the devices, allowing them to function as a single device, which may be termed a fog device or system (e.g., as described above with reference to FIG. 7).

Figure 9:
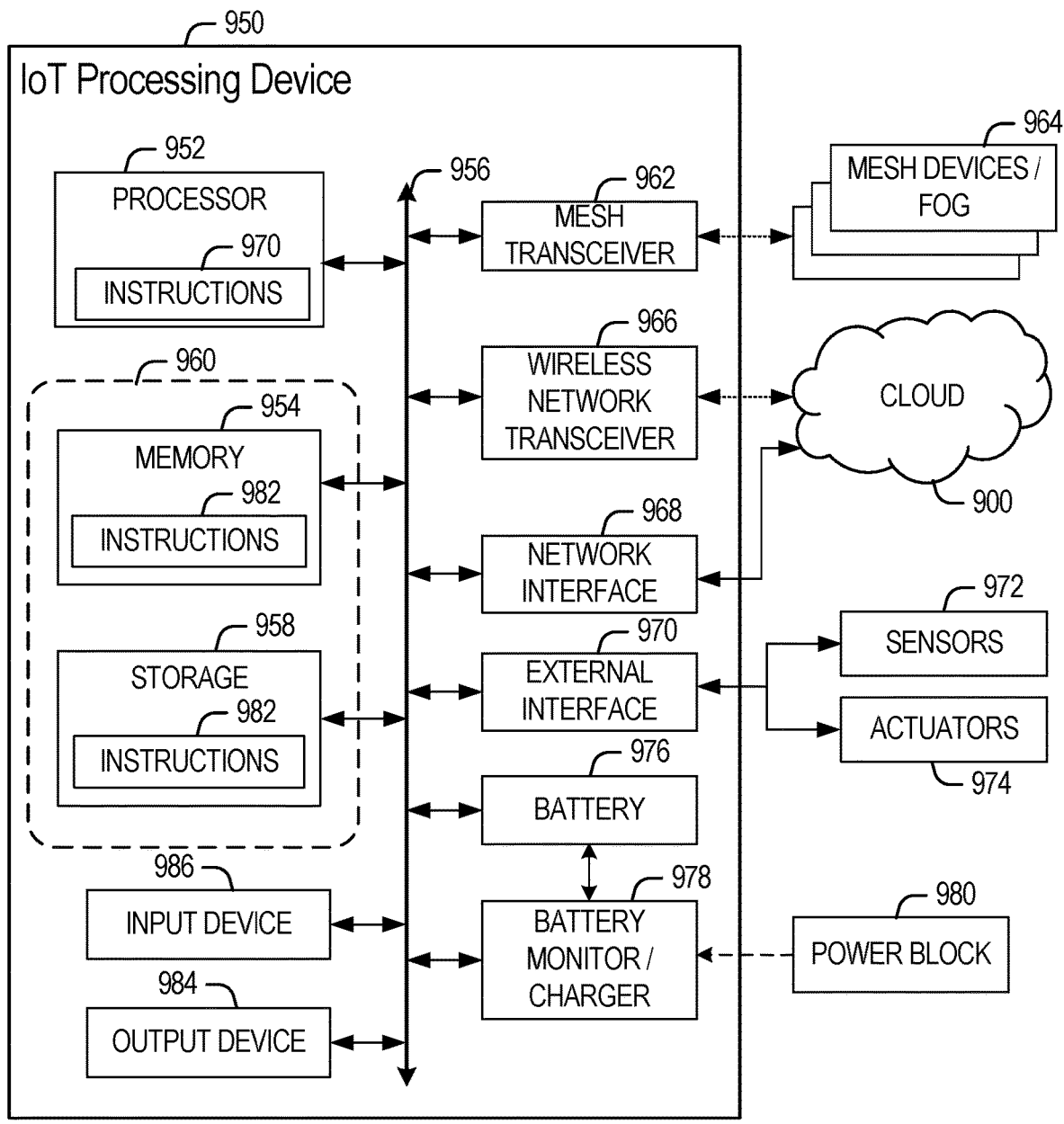

FIG. 9 is a block diagram of an example of components that may be present in an IoT device 950 for implementing the techniques described herein. The IoT device 950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 950, or as components otherwise incorporated within a chassis of a larger system. Additionally, the block diagram of FIG. 9 is intended to depict a high-level view of components of the IoT device 950. However, some of the components shown may be omitted, additional components may be present, and different arrangement of the components shown may occur in other implementations.

The IoT device 950 may include a processor 952, which may be a microprocessor, a multi-core processor, a multi-threaded processor, an ultra-low voltage processor, an embedded processor, or other known processing element. The processor 952 may be a part of a system on a chip (SoC) in which the processor 952 and other components are formed into a single integrated circuit, or a single package, such as the Edison™ or Galileo™ SoC boards from Intel. As an example, the processor 952 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example, the storage 958 may be implemented via a solid state disk drive (SSDD). Other devices that may be used for the storage 958 include flash memory cards, such as SD cards, microSD cards, xD picture cards, and the like, and USB flash drives. In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in a SoC based system. Other bus systems may be included, such as an I2C interface, an SPI interface, point to point interfaces, and a power bus, among others.

The interconnect 956 may couple the processor 952 to a mesh transceiver 962, for communications with other mesh devices 964. The mesh transceiver 962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 962 may communicate using multiple standards or radios for communications at different range. For example, the IoT device 950 may communicate with close devices, e.g., within about 10 meters, using a local transceiver based on BLE, or another low power radio, to save power. More distant mesh devices 964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 966 may be included to communicate with devices or services in the cloud 900 via local or wide area network protocols. The wireless network transceiver 966 may be a LPWA transceiver that follows the IEEE 802.15.4, or IEEE 802.15.4g standards, among others. The IoT device 950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 962 and wireless network transceiver 966, as described herein. For example, the radio transceivers 962 and 966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 962 and 966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 968 may be included to provide a wired communication to the cloud 900 or to other devices, such as the mesh devices 964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to allow connect to a second network, for example, a NIC 968 providing communications to the cloud over Ethernet, and a second NIC 968 providing communications to other devices over another type of network.

The interconnect 956 may couple the processor 952 to an external interface 970 that is used to connect external devices or subsystems. The external devices may include sensors 972, such as accelerometers, level sensors, flow sensors, optical light sensors, camera sensors, temperature sensors, a global positioning system (GPS) sensors, pressure sensors, barometric pressure sensors, and the like. The external interface 970 further may be used to connect the IoT device 950 to actuators 974, such as power switches, valve actuators, an audible sound generator, a visual warning device, and the like.

In some optional examples, various input/output (I/O) devices may be present within, or connected to, the IoT device 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 950.

A battery 976 may power the IoT device 950, although in examples in which the IoT device 950 is mounted in a fixed location, it may have a power supply coupled to an electrical grid. The battery 976 may be a lithium ion battery, or a metal-air battery, such as a zinc-air battery, an aluminum-air battery, a lithium-air battery, and the like.

A battery monitor/charger 978 may be included in the IoT device 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2790 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) convertor that allows the processor 952 to directly monitor the voltage of the battery 976 or the current flow from the battery 976. The battery parameters may be used to determine actions that the IoT device 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the IoT device 950. A wireless battery charging circuit, such as an LTC4020 chip from Linear Technologies of Milpitas, Calif., among others, may be included in the battery monitor/charger 978. The specific charging circuits chosen depend on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine readable medium 960 including code to direct the processor 952 to perform electronic operations in the IoT device 950. The processor 952 may access the non-transitory, machine readable medium 960 over the interconnect 956. For instance, the non-transitory, machine readable medium 960 may include storage units such as optical disks, flash drives, or any number of other hardware devices. The non-transitory, machine readable medium 960 may include instructions to direct the processor 952 to perform a specific sequence or flow of actions, for example, as described with respect to the flowchart(s) and diagram(s) of operations and functionality described throughout this disclosure.

Example Computing Architectures

Figure 10:
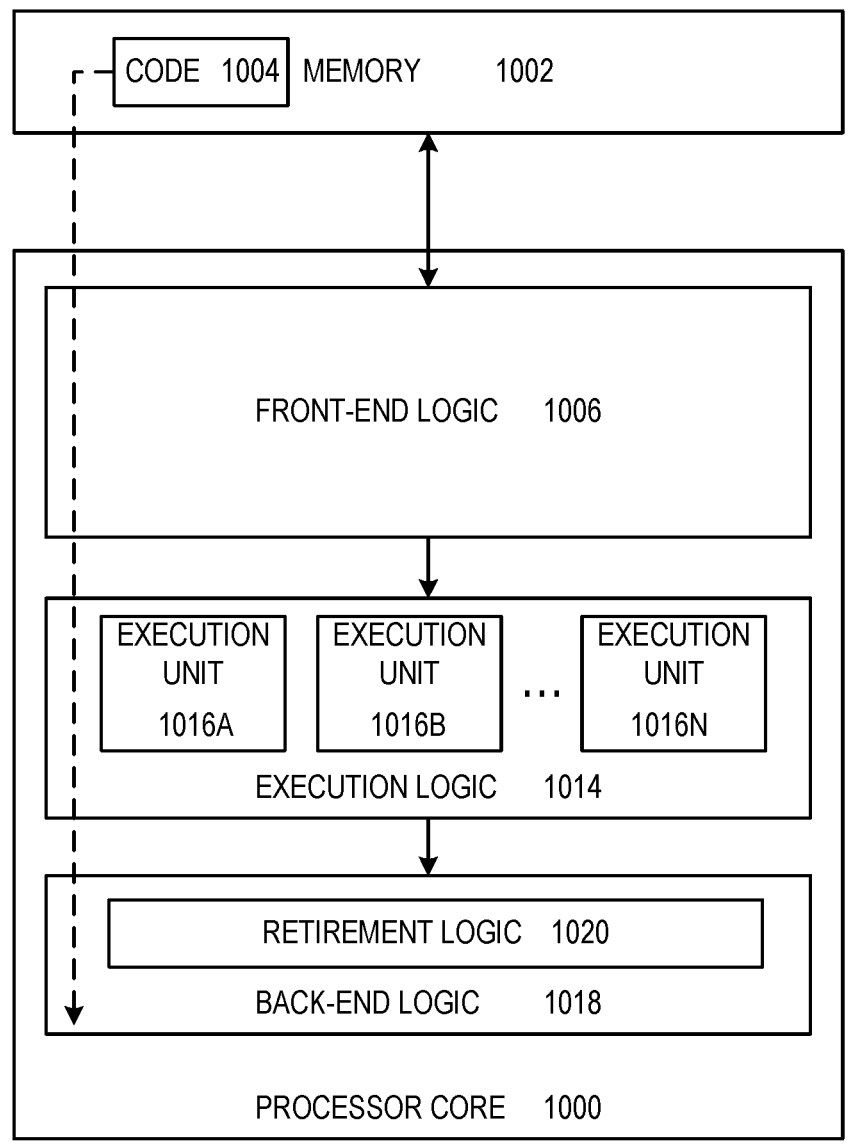
FIGS. 10 and 11 illustrate example computer architectures that can be used in accordance with certain embodiments.
Figure 11:
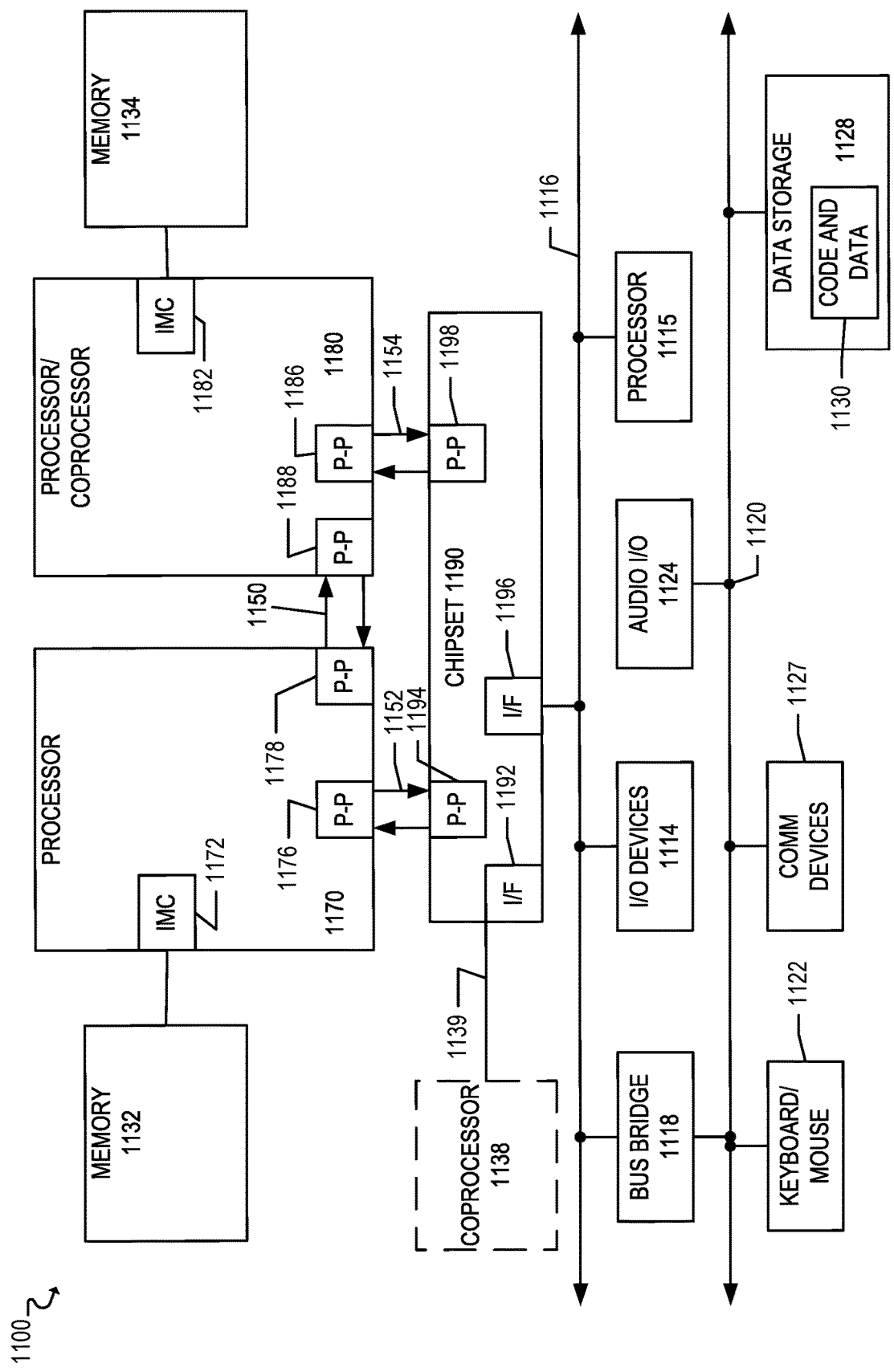

FIGS. 10 and 11 illustrate example computer processor architectures that can be used in accordance with embodiments disclosed herein. For example, in various embodiments, the computer architectures of FIGS. 10 and 11 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 10 illustrates a block diagram for an example embodiment of a processor 1000. Processor 1000 is an example of a type of hardware device that can be used in connection with the embodiments described throughout this disclosure. Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 may also include register renaming logic and scheduling logic, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

FIG. 11 illustrates a block diagram for an example embodiment of a multiprocessor 1100. As shown in FIG. 11, multiprocessor system 1100 is a point-to-point interconnect system, and includes a first processor 1170 and a second processor 1180 coupled via a point-to-point interconnect 1150. In some embodiments, each of processors 1170 and 1180 may be some version of processor 1000 of FIG. 10.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of this disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

All or part of any component of FIG. 11 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The machine-readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a network interface to communicate over a network; and a processor to: receive, via the network interface, a plurality of data streams to be routed over the network, wherein the plurality of data streams correspond to sensor data captured by a plurality of sensors; identify a set of related data streams from the plurality of data streams, wherein the set of related data streams correspond to a portion of the sensor data that is contextually related, and wherein the set of related data streams are identified based on analyzing the plurality of data streams; identify a convergence function to be performed on the set of related data streams, wherein the convergence function is for transforming the set of related data streams into a converged data stream that is smaller in size than the set of related data streams, and wherein the convergence function is identified based on analyzing the set of related data streams; perform the convergence function to transform the set of related data streams into the converged data stream; and route, via the network interface, the converged data stream to one or more corresponding destinations over the network.

In one example embodiment of an apparatus, the processor to identify the set of related data streams from the plurality of data streams is further to: determine that the set of related data streams are contextually related based on a type of content within the set of related data streams.

In one example embodiment of an apparatus, the processor to identify the set of related data streams from the plurality of data streams is further to: determine that the portion of the sensor data corresponding to the set of related data streams was captured within a particular proximity in location and time.

In one example embodiment of an apparatus, the processor to identify the set of related data streams from the plurality of data streams is further to: identify a plurality of content names associated with the plurality of data streams, wherein each content name of the plurality of content names indicates a type of content within a particular data stream of the plurality of data streams; and determine that the set of related data streams are contextually related based on the plurality of content names associated with the plurality of data streams.

In one example embodiment of an apparatus: the network comprises an information-centric network; and the plurality of content names correspond to entries of a pending interest table associated with the information-centric network.

In one example embodiment of an apparatus, the plurality of content names correspond to a plurality of uniform resource identifiers associated with the plurality of data streams.

In one example embodiment of an apparatus, the processor to identify the convergence function to be performed on the set of related data streams is further to: select the convergence function from a plurality of convergence functions based on a type of content within the set of related data streams.

In one example embodiment of an apparatus: the convergence function comprises a compression function for compressing the set of related data streams; and the processor to perform the convergence function to transform the set of related data streams into the converged data stream is further to compress the set of related data streams using the compression function.

In one example embodiment of an apparatus: the convergence function comprises a sensor fusion function for combining the portion of the sensor data corresponding to the set of related data streams; and the processor to perform the convergence function to transform the set of related data streams into the converged data stream is further to combine the portion of the sensor data using the sensor fusion function.

In one example embodiment of an apparatus: the convergence function comprises an analytic function for analyzing content within the set of related data streams; and the processor to perform the convergence function to transform the set of related data streams into the converged data stream is further to: analyze the content within the set of related data streams using the analytic function, wherein the analytic function is to output a summary of the content; and generate metadata corresponding to the summary of the content, wherein the converged data stream is to comprise the metadata.

In one example embodiment of an apparatus: the plurality of sensors comprise a plurality of cameras; and the set of related data streams comprise visual data captured by the plurality of cameras.

In one example embodiment of an apparatus: the convergence function comprises an object detection function for detecting one or more objects within the visual data captured by the plurality of cameras; and the processor to perform the convergence function to transform the set of related data streams into the converged data stream is further to: detect the one or more objects within the visual data using the object detection function; and generate metadata corresponding to the one or more objects that are detected within the visual data, wherein the converged data stream is to comprise the metadata.

In one example embodiment of an apparatus, the processor to perform the convergence function to transform the set of related data streams into the converged data stream is further to discard one or more redundant data streams from the set of related data streams.

In one example embodiment of an apparatus, the processor to perform the convergence function to transform the set of related data streams into the converged data stream is further to convert the set of related data streams into a lower resolution format.

In one example embodiment of an apparatus, the lower resolution format is 1/n of a size of the set of related data streams.

One or more embodiments may include a system, comprising: a network interface to receive a plurality of data streams, wherein the plurality of data streams are to be routed over a network, and wherein the plurality of data streams correspond to sensor data captured by a plurality of sensors; a shared memory to store the plurality of data streams; and one or more processors to: access the plurality of data streams via the shared memory; identify a set of related data streams from the plurality of data streams, wherein the set of related data streams correspond to a portion of the sensor data that is contextually related, and wherein the set of related data streams are identified based on analyzing the plurality of data streams; identify a convergence function to be performed on the set of related data streams, wherein the convergence function is for transforming the set of related data streams into a converged data stream that is smaller in size than the set of related data streams, and wherein the convergence function is identified based on analyzing the set of related data streams; perform the convergence function to transform the set of related data streams into the converged data stream; and route, via the network interface, the converged data stream to one or more corresponding destinations over the network.

In one example embodiment of a system, the system further comprises a cache to store the converged data stream, wherein the converged data stream is to be accessed via the cache for subsequent routing to one or more additional destinations over the network.

In one example embodiment of a system, the one or more processors comprise an accelerator circuit to accelerate performance of the convergence function.

In one example embodiment of a system, the accelerator circuit comprises a field-programmable gate array (FPGA) to accelerate performance of a plurality of convergence functions, wherein the plurality of convergence functions are programmable.

In one example embodiment of a system, the accelerator circuit comprises an application-specific integrated circuit (ASIC) to accelerate performance of a plurality of convergence functions.

In one example embodiment of a system, the shared memory is to provide zero-copy access to the plurality of data streams.

One or more embodiments may include at least one machine accessible storage medium having instructions stored thereon, wherein the instructions, when executed on a machine, cause the machine to: receive, via a network interface, a plurality of data streams to be routed over a network, wherein the plurality of data streams correspond to sensor data captured by a plurality of sensors; identify a set of related data streams from the plurality of data streams, wherein the set of related data streams correspond to a portion of the sensor data that is contextually related, and wherein the set of related data streams are identified based on analyzing the plurality of data streams; identify a convergence function to be performed on the set of related data streams, wherein the convergence function is for transforming the set of related data streams into a converged data stream that is smaller in size than the set of related data streams, and wherein the convergence function is identified based on analyzing the set of related data streams; perform the convergence function to transform the set of related data streams into the converged data stream; and route, via the network interface, the converged data stream to one or more corresponding destinations over the network.

In one example embodiment of a storage medium, the instructions that cause the machine to identify the set of related data streams from the plurality of data streams further cause the machine to: determine that the set of related data streams are contextually related based on a type of content within the set of related data streams.

In one example embodiment of a storage medium, the instructions that cause the machine to identify the set of related data streams from the plurality of data streams further cause the machine to: determine that the portion of the sensor data corresponding to the set of related data streams was captured within a particular proximity in location and time.

In one example embodiment of a storage medium: the plurality of sensors comprise a plurality of cameras; the set of related data streams comprise visual data captured by the plurality of cameras; the convergence function comprises a video stitching function for combining the visual data captured by the plurality of cameras; and the instructions that cause the machine to perform the convergence function to transform the set of related data streams into the converged data stream further cause the machine to combine the visual data captured by the plurality of cameras using the video stitching function.

In one example embodiment of a storage medium: the plurality of sensors comprise a plurality of cameras; the set of related data streams comprise visual data captured by the plurality of cameras; the convergence function comprises an object detection function for detecting one or more objects within the visual data captured by the plurality of cameras; and the instructions that cause the machine to perform the convergence function to transform the set of related data streams into the converged data stream further cause the machine to: detect the one or more objects within the visual data using the object detection function; and generate metadata corresponding to the one or more objects that are detected within the visual data, wherein the converged data stream is to comprise the metadata.

One or more embodiments may include a method, comprising: receiving, via a network interface, a plurality of data streams to be routed over a network, wherein the plurality of data streams correspond to sensor data captured by a plurality of sensors; identifying a set of related data streams from the plurality of data streams, wherein the set of related data streams correspond to a portion of the sensor data that is contextually related, and wherein the set of related data streams are identified based on analyzing the plurality of data streams; identifying a convergence function to be performed on the set of related data streams, wherein the convergence function is for transforming the set of related data streams into a converged data stream that is smaller in size than the set of related data streams, and wherein the convergence function is identified based on analyzing the set of related data streams; performing the convergence function to transform the set of related data streams into the converged data stream; and routing, via the network interface, the converged data stream to one or more corresponding destinations over the network.

What is claimed is:

1. An apparatus, comprising:
a network interface to communicate over a network; and
a processor to:
receive, via the network interface, a plurality of data streams to be routed over the network, wherein the plurality of data streams each contain sensor data captured by one or more sensors;
determine, based on analyzing the plurality of data streams, that the plurality of data streams contains a subset of related data streams, wherein at least some of the sensor data contained in the subset of related data streams is contextually related;
select, based on analyzing the subset of related data streams, a convergence function for generating a converged data stream based on the subset of related data streams
perform the convergence function on the subset of related data streams to generate the converged data stream, wherein the converged data stream represents at least some of the sensor data contained in the subset of related data streams, and wherein the converged data stream is smaller in size than the subset of related data streams; and
route, via the network interface, the converged data stream to one or more corresponding destinations over the network.

2. The apparatus of claim 1, wherein the processor to determine, based on analyzing the plurality of data streams, that the plurality of data streams contains the subset of related data streams is further to:
determine that the subset of related data streams are contextually related based on a type of content within the subset of related data streams.

3. The apparatus of claim 1, wherein the processor to determine, based on analyzing the plurality of data streams, that the plurality of data streams contains the subset of related data streams is further to:

determine that at least some of the sensor data contained in the subset of related data streams was captured within a particular proximity in location and time.

4. The apparatus of claim 1, wherein the processor to determine, based on analyzing the plurality of data streams, that the plurality of data streams contains the subset of related data streams is further to:

identify a plurality of content names associated with the plurality of data streams, wherein each content name of the plurality of content names indicates a type of content within a particular data stream of the plurality of data streams; and determine that the subset of related data streams are contextually related based on the plurality of content names associated with the plurality of data streams.

5. The apparatus of claim 4, wherein:

the network comprises an information-centric network; and the plurality of content names correspond to entries of a pending interest table associated with the information-centric network.

6. The apparatus of claim 4, wherein the plurality of content names correspond to a plurality of uniform resource identifiers associated with the plurality of data streams.

7. The apparatus of claim 1, wherein the processor to select, based on analyzing the subset of related data streams, the convergence function for generating a converged data stream based on the subset of related data streams is further to:

select the convergence function from a plurality of convergence functions based on a type of content within the subset of related data streams.

8. The apparatus of claim 1, wherein:

the convergence function comprises a compression function for compressing the subset of related data streams; and the processor to perform the convergence function on the subset of related data streams to generate the converged data stream is further to compress the subset of related data streams using the compression function.

9. The apparatus of claim 1, wherein:

the convergence function comprises a sensor fusion function for combining at least some of the sensor data contained in the subset of related data streams; and the processor to perform the convergence function on the subset of related data streams to generate the converged data stream is further to combine at least some of the sensor data using the sensor fusion function.

10. The apparatus of claim 1, wherein:

the convergence function comprises an analytic function for analyzing content within the subset of related data streams; and the processor to perform the convergence function on the subset of related data streams to generate the converged data stream is further to:

analyze the content within the subset of related data streams using the analytic function, wherein the analytic function is to output a summary of the content; and generate metadata corresponding to the summary of the content, wherein the converged data stream is to comprise the metadata.

11. The apparatus of claim 1, wherein:

the plurality of sensors comprise a plurality of cameras; and the subset of related data streams comprise visual data captured by the plurality of cameras.

12. The apparatus of claim 11, wherein:

the convergence function comprises an object detection function for detecting one or more objects within the visual data captured by the plurality of cameras; and the processor to perform the convergence function on the subset of related data streams to generate the converged data stream is further to:

detect the one or more objects within the visual data using the object detection function; and generate metadata corresponding to the one or more objects that are detected within the visual data, wherein the converged data stream is to comprise the metadata.

13. The apparatus of claim 1, wherein the processor to perform the convergence function on the subset of related data streams to generate the converged data stream is further to discard one or more redundant data streams from the subset of related data streams.

14. The apparatus of claim 1, wherein the processor to perform the convergence function on the subset of related data streams to generate the converged data stream is further to convert the subset of related data streams into a lower resolution format.

15. The apparatus of claim 14, wherein the lower resolution format is 1/n of a size of the subset of related data streams, wherein n represents a number greater than 1.

\* \* \* \* \*